United States Patent [19]

Lee et al.

[11] Patent Number: 5,611,932
[45] Date of Patent: Mar. 18, 1997

[54] METHOD FOR THE PURIFICATION OF RECLAIMED AQUEOUS N-METHYLMORPHOLINE N-OXIDE SOLUTION

[75] Inventors: Wha S. Lee; Seong M. Jo; Chong S. Park; Yong K. Hong, all of Seoul, Rep. of Korea

[73] Assignee: Korea Institute of Science and Technology, Seoul, Rep. of Korea

[21] Appl. No.: 413,302

[22] Filed: Mar. 30, 1995

[30] Foreign Application Priority Data

Apr. 27, 1994 [KR] Rep. of Korea .................... 1994-8948

[51] Int. Cl.$^6$ .............................. B01J 39/00; B01D 15/04
[52] U.S. Cl. ........................ 210/669; 210/679; 210/688; 210/663
[58] Field of Search .................................. 210/638, 669, 210/663, 688, 679

[56] References Cited

U.S. PATENT DOCUMENTS

| | | | |
|---|---|---|---|
| 4,748,241 | 5/1988 | Scholten et al. | 544/173 |
| 5,118,423 | 6/1992 | Astegger et al. | 210/638 |
| 5,189,152 | 2/1993 | Hinterholzer et al. | 536/56 |
| 5,441,689 | 8/1995 | Laity | 264/179 |

FOREIGN PATENT DOCUMENTS

| | | |
|---|---|---|
| 0427701 | 5/1991 | European Pat. Off. . |
| 0467008 | 1/1992 | European Pat. Off. . |
| 254199 | 12/1986 | German Dem. Rep. . |
| 259863 | 4/1987 | German Dem. Rep. . |
| WO93/11287 | 6/1993 | WIPO . |

*Primary Examiner*—Jeffrey C. Mullis
*Attorney, Agent, or Firm*—Townsend and Townsend and Crew

[57] ABSTRACT

There is disclosed a method for purifying a used aqueous N-methylmorpholine N-oxide solution reclaimed from a spinning aqueous solution, which results from a coagulation solution into which a cellulose dope containing N-methylmorpholine N-oxide is extruded through a spinning die and from a washing solution for the coagulated cellulosic articles in manufacture processes for cellulose fibers or films, comprising adding an oxidant to the used aqueous N-methylmorpholine N-oxide solution to remove impurities therefrom through oxidation N-methylmorpholine into N-methylmorpholine N-oxide and break down of the chromophores of the impurities. Utterly distinguished from, conventional methods in the principle, the method is very simple and efficient as well as far superior to the conventional methods using ion exchange resin in the decoloration. In addition, it needs not suffer a loss of amine oxide as usual in the ion exchange resin. Further, the oxidant can achieve the decolorization without influence of concentration of amine oxides. The amine oxide decolorized by the oxidant may be used to prepare the cellulose dope without any more purification. Provided that sequential use of the oxidant and the resin or active carbon, there are brought about much higher efficiency as well as much purer aqueous amine oxide solution.

6 Claims, No Drawings

METHOD FOR THE PURIFICATION OF RECLAIMED AQUEOUS N-METHYLMORPHOLINE N-OXIDE SOLUTION

BACKGROUND OF THE INVENTION

1. Field Of The Invention

The present invention relates, in general, to regeneration of N-methylmorpholine N-oxide used to prepare a cellulose fiber or film and, more particularly, to a method for decolorizing a used aqueous N-methylmorpholine N-oxide solution through purification of coloring impurities of an aqueous solution after spinning.

2. Description Of The Prior Art

For cellulose fiber or film, a spinning cellulose dope containing N-methylmorpholine N-oxide as a solvent is usually extruded into an aqueous coagulation solution through a spinning die with the N-methylmorpholine N-oxide being eluted, and then subjected to washing. In this procedure, there is generation of an enormous quantity of spinning aqueous solution (a coagulating solution and a washing solution) in which N-methylmorpholine N-oxide is dissolved at a low content.

The cellulose dope employing N-methyl morpholine N-oxide as a solvent is prepared at a high temperature, and the dope is heated when it is extruded through a spinning die. However, N-methylmorpholine N-oxide is apt to decompose due to the high temperature, generating coloring impurities. Consequently, the cellulose dope may be discolored by them.

Most of the coloring impurities are eluted along with N-methyl morpholine N-oxide in the coagulating and the washing processes, but some remain unremoved even by further washing processes, coloring the final articles, such as fibers or films, ultimately. Therefore, a bleaching process is additionally required.

In order to reclaim and reuse the N-methylmorpholine N-oxide which is dissolved in the spinning aqueous solution at a low content, concentration is performed, followed by purification. N-methylmorpholine N-oxide reclaimed but not purified is tinged with dark brown by the coloring impurities contained. In the case that the reclaimed N-methylmorpholine N-oxide is used to produce fibers or films without removing the coloring impurities, continuous accumulation of them comes to tinge the final articles with color, deleteriously affecting the final articles.

As a basic solution for the discoloration problem, there is use of pure cellulose (commercially available wood pulp with little coloring organic materials) and highly purified N-methylmorpholine N-oxide.

D.D. Patent No. 259,863 discloses treatment with a cation exchange resin of sulfonized divinyl benzene-styrene copolymer at pH 5–8 ($H_3PO_4$), thereby increasing purity of an aqueous N-methylmorpholine N-oxide solution obtaining from oxidation of N-methylmorpholine.

In many patents including European Patent No. 0 047 929, DE Patent Nos. 3 034 685 A1 (Akzo) and 41 06 029 A1 (Lenzing A. -G.), PCT WO83/04415, U.S. Pat. No. 4,581,072 (Courtaulds), and D.D. Patent Nos. 229 708 A1, 218 104 A1 (VEB Chem) and 158 656 (ADW I.F.P), there are described a variety of antioxidants to suppress oxidative thermal degradation of both cellulose and N-methylmorpholine N-oxide.

European Patent No 467,008 (Lenzing A. -G.) discloses that 0.01–2% of $H_2O_2$ along with a stabilizing additive is added to prepare a cellulose dope, thereby suppressing the oxidative thermal degradation of N-methylmorpholine N-oxide in the course of production and extrusion of the dope.

However, even though highly pure raw materials are used and the antioxidants are added as mentioned above, perfect suppression of oxidative thermal degradation is impossible. In fact, alkaline bleaching (e.g. aqueous sodium hypochlorite solution or aqueous hydrogen peroxide/sodium hydroxide solution) is carried out for the colored article, followed by further processes such as neutralization and washing.

According to PCT WO 92/14871 (Courtaulds), it is reported that the alkaline bleaching, however, causes fibrillation of fiber, leading to occurrence of defects which are fatal to dyeing property of fabric and to forming pills on its surface.

An effort has been made to purify the aqueous N-methylmorpholine N-oxide solution reclaimed after the production of cellulose fiber or film.

For example, D.D. Patent No. 254 199 A1 (VEB Chem.) suggests a purification method comprising passing an aqueous solution containing 5 to 60% by weight of amine oxide through an anion exchange resin of styrene-divinyl copolymer. According to this patent, the aqueous amine oxide solution is treated initially with a weak anion exchange resin with the amine group of —$CH_2N(CH_3)_2$ and then with a resin with the tertiary ammonium group of —$CH_2[N(CH_3)_3]^+OH^-$. After passing through the first resin column, the deep brown aqueous solution is purified into pale brown or yellow, which is further purified into pale yellow or colorless by the second resin column. The supra patent also says that the used resins can be regenerated by treatment with 3 wt % aqueous sodium hydroxide solution and 10 wt % aqueous sodium chloride solution. Such method can take off coloring impurities from the aqueous amine oxide solution, however, the regeneration of resin by strong alkali is unsatisfactory, so that the separation efficiency of the regenerated resin drops largely.

In addition, European Patent No. 0 427 701 A1 (Lenzing A. -G.) discloses use of a resin with —$CH_2[N(CH_3)_3]^+X^-$ or —$CH_2[N(CH_3)_2(CH_2OH)]^+X^-$ group, wherein $X^-$ is an anion of organic or inorganic acid. The resin is regenerated by a volatile acid, such as hydrochloric acid, carbonic acid, formic acid and acetic acid, which in turn is reclaimed by distillation. The resin regenerated is able to purify the aqueous amine oxide solution and thus, to give decolorized solution in a high efficiency. However, when strong inorganic acid, e.g. hydrochloric acid is employed, there is an disadvantage that apparatus is highly apt to be corroded because hydrochloric acid or a salt of $Cl^-$ is eluted along with the aqueous solution.

Unlike two supra patents using either alkali or acid to regenerate the resin, PCT WO92/11287 (Courtaulds) suggests use of both alkali and acid stepwise to regenerate resin, thereby more efficiently removing the impurities adsorbed on the resin. According to the patent, an anion exchange resin with —$CH_2[N(CH_3)_3]^+X^-$ or —$CH_2[N(CH_3)_2(CH_2OH)]^+X^-$ group which has purified the reclaimed aqueous amine oxide solution is treated initially with an aqueous 1–10 wt % hydrochloric acid or sodium chloride solution to take off most of coloring impurities with the $X^-$ ions of resin being changed into $Cl^-$ ions, and then treated with an aqueous 1–10 wt % sodium hydroxide solution with $X^-$ ions of resin being changed into $OH^-$ ions. In the second treatment, sodium hydroxide is used in the same equivalent as the strong acid or in a little larger equivalent (mole ratio 1.0–1.1) to elute a neutralized solution containing only sodium chloride, thereby preventing the corrosion of apparatus.

All the described methods using ion exchange resins can purify the aqueous amine oxide solution and thus give a decolorized solution, but generates a strong acidic solution, a strong alkaline solution or a salt solution containing coloring impurities during the regeneration of resin. To prevent the pollution by these waste solution, re-treatment processes such as concentration and incineration are required. In addition, since the resin is not lasting but has a life span of 2–3 years, equipment and its operation cost too much. Further, because amine oxide as well as the coloring impurities is well absorbed into the resin, the loss of amine oxide is considerable at high concentration. For example, when an aqueous 62 wt % amine oxide solution is treated with anion exchange resin, an aqueous 43 wt % amine oxide solution is obtained after purification and decolorization. Furthermore, as the concentration of amine oxide is higher (e.g. not less than 40%), the absorption efficiency of resin for the coloring impurities becomes low steepy. This is a main obstacle that restrains the resin from being used to purify an aqueous amine oxide solution with a high concentration. So, there is a troublesome problem that the resin should deal with more increased quantity of aqueous amine oxide solution diluted into a lower concentration.

In general, active carbon rather than the ion exchange resins is frequently used to remove the coloring impurities because of its cheapness. It is well known that active carbon is used in two forms: bead and powder. Active carbon bead capacitates continuous work for taking off the coloring impurities. In addition, used active carbon bead can be regenerated, like the ion exchange resin. But, it is low in adsorption rate and has difficulty in yielding a high purity. On the other hand, active carbon powder is superior in adsorption rate and capable of purifying the aqueous amine oxide solution in high degrees in batch type. However, active carbon powder is uneconomical because the used cannot be regenerated. Further, active carbon powder does not allow continuous work.

In purifying the aqueous amine oxide solution, active carbon bead can treat it successively and be used repetitively through regeneration. Active carbon bead, however, is remarkably low in decolorizing power as compared with the anion exchange resin. Especially, the coloring impurities contained in a high concentration of the aqueous amine oxide solution is not readily absorbed into the active carbon bead relative to on the anion exchanger.

By contraries, active carbon powder is much superior to the anion exchanger in decolorizing and purifying the reclaimed amine oxide at high content as well as at low content, even if it is less economical than active carbon bead.

Meanwhile, it is reported in Cellulose Chem. Technol. 20, pp. 289–301 (1986) to H. Lang et al that when a cellulose dope containing N-methylmorpholine N-oxide is subjected to high temperature, both cellulose and N-methylmorpholine N-oxide are decomposed, mainly giving N-methylmorpholine, morpholine and carbon dioxide. It is also reported that N-methylmorpholine amounts up to 85% of the decomposed products from N-methylmorpholine N-oxide.

Das Papier. 40 (12), pp 615–619 (1986) to F. A. Buijtenhuijs et al also reports a similar result that the decomposed products of N-methylmorpholine N-oxide are mainly comprised of N-methylmorpholine and asserts that, when cellulose/N-methylmorpholine N-oxide solution is heated at 120° C. for 16 hours, N-methylmorpholine N-oxide is decomposed in an amount of about 2% by weight in the presence of propyl gallate, an antioxidant, and in an amount of about 5% by weight in the absence of propyl gallate. They also reports that metal ions such as copper and iron ions contained in a spinning dope catalyze the decomposition of amine oxide as well as the cellulose.

According to Zh. Prikl. Khim. (Leningrad), 60(9) 2063–2067 (1987) and Zh. Prikl. Khim. (Leningrad), 61(1) 117–123 (1988), both to A. M. Bochek et al, a cellulose solution in amine oxides such as triethylamine N-oxide, N-methylmorpholine N-oxide and N,N-dimethylethanolamine N-oxide partially decomposes at high temperatures, not only into N-methylmorpholine and morpholine with the N—O bond of amine oxide being broken down, but into olefins.

It is well known that when amine oxides having beta-hydrogen are decomposed at high temperatures, hydroxyl amines and olefins are generated with the oxygen moiety of amine oxide catching the beta-hydrogen. Such reaction is widely utilized for a synthesis path for new olefins (reference, J. D. Roberta and M. C. Caserio, Basic Principles of organic chemistry p 1964).

There has been known no detailed and accurate information for the compositions and components of the coloring impurities resulting from the heat decomposition of N-methylmorpholine N-oxide. Nonetheless, it is believed that even little amount of the coloring impurities tinge the aqueous amine oxide solution reclaimed with dark brown and they are in close relation with the olefin compounds generated on heat decomposition of N-methylmorpholine N-oxide.

SUMMARY OF THE INVENTION

It is, therefore, an object of the present invention to provide a method for purifying an aqueous N-methylmorpholine N-oxide solution reclaimed from a used aqueous solution after spinning. The method is superior in decolorizing the solution.

It is another object of the present invention to provide a method for purifying an aqueous N-methylmorpholine N-oxide solution reclaimed from a used spinning aqueous solution, profitable in economy and high in efficiency.

It is a further object of the present invention to provide a method for purifying an aqueous N-methylmorpholine N-oxide solution reclaimed from a used spinning aqueous solution, capable of decoloration without influence of the concentration of amine oxide.

Based on the intensive study by the present inventors, the present invention is designed in the idea that addition of a small amount of oxidant into the reclaimed aqueous N-methylmorpholine N-oxide solution can oxidize N-methylmorpholine, a main heat decomposition product, into N-methylmorpholine N-oxide and remove the coloring tinge through oxidation of the chromophore of the coloring impurities.

In accordance with the present invention, the above objects could be accomplished by a provision of a method for purifying a used aqueous N-methylmorpholine N-oxide solution reclaimed from a spinning solution, which results from a coagulation solution into which a cellulose dope is extruded through a spinning die and from a washing solution for the coagulated cellulosic articles in manufacture processes for cellulose fibers or films, comprising addition of an oxidant into the used aqueous N-methylmorpholine N-oxide solution to remove impurities therefrom through oxidation N-methylmorpholine into N-methylmorpholine N-oxide and break down of the chromophores of the impurities.

These and other objects and advantages of the present invention will become more apparent as the following description proceeds.

DETAILED DESCRIPTION OF THE INVENTION

In accordance with an aspect of the present invention, an oxidant is added into an aqueous N-methylmorpholine N-oxide solution reclaimed from a used spinning aqueous solution including a coagulation solution and a washing solution which are generated when a cellulose dope containing N-methylmorpholine N-oxide as a solvent is extruded into the coagulation solution through a spinning die and then washed.

The aqueous N-methylmorpholine N-oxide solution reclaimed from the used spinning aqueous solution usually contains N-methylmorpholine N-oxide in amounts ranging from approximately 5 to approximately 75% by weight. Typically, the reclaimed N-methylmorpholine N-oxide solution is tinged with dark brown.

Depending on the colored extent of the reclaimed aqueous N-methylmorpholine N-oxide solution, the oxidant is added in an amount of approximately 0.1 to approximately 10% by weight with a range of approximately 1 to approximately 5% by weight being preferred.

Maintenance of the colored, aqueous N-methylmorpholine N-oxide solution added with the oxidant at a temperature ranging from approximately 20 to approximately 100° C., preferably approximately 60 to approximately 80° C. allows the solution to be decolorized gradually and to be changed into reusable one finally. The time for the decolorization is dependent on the colored extent of the aqueous N-methylmorpholine N-oxide solution, and the kind and amount of the oxidant.

Usually, high temperature promotes the decoloration. For example, it takes several days at room temperature for the dark brown solution to be decolorized to pale yellow, whereas it takes about 30 minutes at 70° C. to yellow and only additional 30 minutes at the same temperature to pale yellow or almost colorless.

According to the present invention, aqueous hydrogen peroxide and aqueous peroxides of volatile organic acids, such as $HCO_3$, $CH_3CO_3H$, and $CH_3CH_2CO_3H$, may be used as the oxidant. Such peroxides of volatile organic acid, however, are disadvantageous in that their organic acids remain in the aqueous amine oxide solution. Thus, aqueous hydrogen peroxide is more preferable.

In accordance with another aspect of the present invention, the resulting aqueous N-methylmorpholine N-oxide solution purified is preferably deprived of metal ions in an ordinary manner. Since metal ions, especially, iron or copper ions, promote the decomposition of amine oxides at high temperatures, they should not be accumulated in recycling amine oxides. Metal ions contained in the aqueous amine oxide solution may result from metal apparatuses such as metal vessels used during the total procedure as well as from a trace amount of metals captured by the cellulose or amine oxides. Therefore, a cation exchange resin may be used to remove the metal ions, especially, iron or copper ions. Alternatively, chitosan may preferably be used for the same purpose. Chitosan is very fast in absorbing and detaching the metal ions. In case of using chitosan, the metal ions absorbed into chitosan are taken off therefrom in a conventional manner, for example, using ethylenediamine tetraacetic acid (EDTA). Thereafter, the chitosan can be recycled.

With regard to order of the removal of metal ions, it may be carried out, prior to the decoloration as done in conventional methods. To the contrary, in the present invention, the metal ions are more preferably removed by means of cation exchange resin or chitosan, subsequent to the decoloration by the oxidant. The reason is as follows. In conventional methods, the coloring ingredients are removed by absorption of anion exchange resin, whereas, in the present invention, they disappear by oxidation of the chromophores thereof, so that even trace amount of the oxidized ingredients may be left in the reclaimed solution. Thus, the removal of metal ions by chitosan or cation exchange resin subsequent to the decoloration by oxidation can be accompanied by the elimination of the oxidized products of the coloring ingredients through adsorption.

As described hereinbefore, the method according to the present invention is advantageous in many aspects.

On one hand, let us compare it with conventional and known methods using ion exchange resin. The conventional and known methods using ion exchange resin are complicated because the reclaimed aqueous N-methylmorpholine N-oxide solution is purified by absorbing the coloring heat-decomposition products into an anion exchange resin, which is subjected to regeneration by alkali and/or acid, according to them. In addition, the conventional methods are uneconomical because they require immense cost for equipment and its maintenance and the life span of resin is short. Further, the conventional methods are problematic in that pollution is caused by the waste solution generated during the regeneration of resin.

On the contrary, the present method is utterly distinguished from the conventional methods in the principle that the presence of a small amount of oxidant in the reclaimed aqueous N-methylmorpholine N-oxide solution oxidizes N-methylmorpholine, amounting up to 85% of the heat-decomposition products, into N-methylmorpholine N-oxide and removes trace amount of the coloring impurities through oxidation of the chromophores, to decolorize the solution. So, the present method is very simple and efficient. In addition, it is far superior to the conventional methods using ion exchange resin in the decoloration and needs not suffer a loss of amine oxide as usual in the ion exchange resin. Further, distinguished from the ion exchange resin of conventional methods, the oxidant according to the present invention can achieve the decoloration without influence of concentration of amine oxide.

On the other hand, with relation to active carbon bead, whenever used amine oxide is reclaimed, it must be purified. Its purification by either active carbon bead or ion exchange resins requires immense cost for maintenance. In case of active carbon powder, its decolorizing capacity is far better than that of the resin or active carbon bead, but there is such a disadvantage that active carbon powder is difficult to regenerate.

The amine oxide decolorized by the oxidant according to the present method may be used to prepare the cellulose dope without any more purification. However, provided that amine oxides are recycled many times, anion exchange resin or active carbon bead or powder may additionally be used subsequent to the purification of the present invention. In this case, in comparison to the conventional methods using either only anion exchange resin or active carbon, the present method is much higher in efficiency as well as gives a much purer aqueous amine oxide solution.

The preferred embodiments of the present invention will now be further described with reference to the following specific examples. In the following examples, there were used N-methylmorpholine N-oxide solutions that were reclaimed after the preparation of cellulose dope was carried out at higher temperature and for longer time than those in a commercial process of the cellulose dope and fiber manufacture suggested in Korean Patent Application No. 93-18018. Using a UV-spectrophotometer, the concentration of impurities tingeing the aqueous amine oxide solution with color was measured, and its results were represented in amine oxide optical density (AOOD) of a solution containing 1% by weight of the amine oxide.

COMPARATIVE EXAMPLE 1

Into 100 mL of a reclaimed spinning solution A containing 30% by weight of N-methylmorpholine N-oxide, ion exchange resin (Amberlite IRA 416), active carbon powder (Junsei chemical, purity 1 class) and active carbon bead (Samcheonli chemical Co., coal) were separately added in a predetermined amount and then gently stirred at room temperature for 2 hours. The resin, the active carbon powder and the active carbon bead were filtered off, and AOOD values for the resulting filtered solutions were measured. The results are given as shown in the following Table 1.

of 2g/100 mL. Subsequently, the resulting solution was gently stirred at room temperature for 1 hour, and the resin and the active carbon powder were filtered off. AOOD values for the resulting filtered solutions were measured.

The results of measurement are given as shown in the following Table 3.

TABLE 1

| Solution Kind | UV Spectrophotometry | | | | | |
|---|---|---|---|---|---|---|
| | 350 nm | | 400 nm | | 450 nm | |
| | AOOD | % AOOD Drop | AOOD | % AOOD Drop | AOOD | % AOOD Drop |
| Spinning Sol'n A (100 mL) | 0.0940 | — | 0.0467 | — | 0.0280 | — |
| Amberlite IRA 416 | | | | | | |
| 2 g | 0.0330 | 64.9 | 0.0124 | 73.4 | 0.0084 | 70.0 |
| 5 g | 0.0302 | 67.9 | 0.0117 | 74.9 | 0.0083 | 70.4 |
| 10 g | 0.0275 | 70.7 | 0.0107 | 77.1 | 0.0082 | 70.7 |
| Active Carbon Powder | | | | | | |
| 2 g | 0.0055 | 94.1 | 0.0014 | 97.0 | 0.0004 | 98.6 |
| 5 g | 0.0014 | 98.5 | 0.0003 | 99.4 | 0.0001 | 99.6 |
| Active Carbon Bead | | | | | | |
| 2 g | 0.0399 | 57.6 | 0.0158 | 66.2 | 0.0117 | 58.2 |

COMPARATIVE EXAMPLE 2

Into 100 mL of a reclaimed spinning solution B containing 57.6% by weight of N-methylmorpholine N-oxide, 2 g of each ion exchange resin (Amberlite IRA 416), active carbon power (Junsei chemical, purity 1 class) and active carbon bead (Samcheonli chemical, coal) was added respectively and then gently stirred at room temperature for 2 hours. The resin, the active carbon powder and the active carbon bead were filtered off, and AOOD values for the resulting filtered solutions were measured. The results are given as shown in the following Table 2.

TABLE 2

| Solution Kind | UV Spectrophotometry | | | | | |
|---|---|---|---|---|---|---|
| | 350 nm | | 400 nm | | 450 nm | |
| | AOOD | % AOOD Drop | AOOD | % AOOD Drop | AOOD | % AOOD Drop |
| Spinning Sol'n B | 0.04549 | — | 0.01840 | — | 0.00868 | — |
| Amberlite IRA 416 | 0.02474 | 45.6 | 0.00912 | 50.4 | 0.00421 | 51.5 |
| Active Carbon Powder | 0.02193 | 51.8 | 0.000860 | 53.3 | 0.00439 | 49.4 |
| Active Carbon Bead | 0.04211 | 7.4 | 0.01667 | 9.4 | 0.00772 | 11.1 |

EXAMPLE 1

Into 100 mL of a spinning solution A containing 30 % by weight of N-methylmorpholine N-oxide, aqueous hydrogen peroxide was added in an amount of 3% by weight of hydrogen peroxide based on the total weight of the solution and then, kept at 70° C. for a predetermined time. AOOD values for this solution were measured.

After reacting with the aqueous hydrogen peroxide from 120 to 360 minutes, the solution was mixed with each of active carbon powder and Amberlite IRA 416 in an amount

TABLE 3

| Solution Kind | UV Spectrophotometry | | | | | |
|---|---|---|---|---|---|---|
| | 350 nm | | 400 nm | | 450 nm | |
| | AOOD | % AOOD Drop | AOOD | % AOOD Drop | AOOD | % AOOD Drop |
| Spinning Sol'n A | | | | | | |
| 120 min. | 0.0067 | 92.9 | 0.00130 | 97.2 | 0.00033 | 98.8 |
| 240 min. | 0.0047 | 95.0 | 0.00067 | 98.6 | 0.00017 | 99.4 |
| 360 min. | 0.0040 | 95.7 | 0.00033 | 99.3 | 0.00003 | 99.9 |
| Active Carbon Powder | 0.0001 | 99.9 | 0 | 100 | 0 | 100 |
| Amberlite IRA 416 | 0.0013 | 98.6 | 0 | 100 | 0 | 100 |

EXAMPLE 2

Into 100 mL of the same spinning solution as that of Example 1 reacted with aqueous hydrogen peroxide for 360 minutes, 2 g of each Amberlite IRA 416, cation exchange resin (Amberlite IR 120 transformed into H-form) and chitosan was added respectively and then, gently stirred. Filtration was carried out to remove the Amberlite IRA 416, the cation exchange resin and the chitosan. Each of the filtered solutions was investigated to measure the amount of iron and copper ions. The result was that 20 ppm/11 ppm of iron/copper ion was reduced into 4.4 ppm/3 ppm, 1.3 ppm/0.9 ppm and 3.5 ppm/0.7 ppm in Amberlite IRA 416, Amberlite IR 120 and chitosan, respectively.

EXAMPLE 3

Into 100 mL of a reclaimed spinning solution C containing 30% by weight of N-methylmorpholine N-oxide, aqueous hydrogen peroxide was separately added in an amount of 3% by weight and 5% by weight of hydrogen peroxide. The two resulting solutions were kept at a temperature of 60° and 90° C., respectively. With the lapse of reaction time, AOOD values for the solutions were measured. The results are given as shown in the following Table 4.

TABLE 4

| wt % H$_2$O$_2$/ °C. Temp. | Reac. Time Min. | UV Spectrophotometry | | | | | |
|---|---|---|---|---|---|---|---|
| | | 350 nm | | 400 nm | | 450 nm | |
| | | AOOD | % AOOD Drop | AOOD | % AOOD Drop | AOOD | % AOOD Drop |
| Spinning Sol'n C | | 0.12000 | | 0.06367 | | 0.03067 | |
| 3/60 | 60 | 0.06400 | 46.7 | 0.02367 | 62.8 | 0.00967 | 68.7 |
| 3/60 | 120 | 0.04800 | 60.0 | 0.01733 | 72.8 | 0.00800 | 73.9 |
| 3/60 | 260 | 0.02967 | 75.3 | 0.00900 | 85.7 | 0.00333 | 89.1 |
| 5/90 | 15 | 0.04467 | 62.8 | 0.01600 | 74.9 | 0.00733 | 76.1 |
| 5/90 | 30 | 0.01733 | 85.6 | 0.00500 | 92.1 | 0.00200 | 93.5 |
| 5/90 | 60 | 0.01333 | 88.9 | 0.00333 | 94.8 | 0.00167 | 94.6 |
| 5/90 | 95 | 0.01133 | 90.6 | 0.00300 | 95.3 | 0.00133 | 95.7 |

EXAMPLE 4

In 100 mL of the same spinning solution as that of Comparative Example 2 containing 57.6% by weight of N-methylmorpholine N-oxide, aqueous hydrogen peroxide water was separately added in an amount of 1 and 3% by weight of hydrogen peroxide based on the total weight of the solution and then, kept at 70° C. With the lapse of reaction time, AOOD values for the solutions were measured. The results are given as shown in the following Table 5.

TABLE 5

| | | UV Spectrophotometry | | | | | |
|---|---|---|---|---|---|---|---|
| | | 350 nm | | 400 nm | | 450 nm | |
| wt % H$_2$O$_2$ | Reac. Time Min. | AOOD | % AOOD Drop | AOOD | % AOOD Drop | AOOD | % AOOD Drop |
| 1 | 120 | 0.02257 | 50.4 | 0.00764 | 58.5 | 0.00278 | 68.0 |
| 1 | 240 | 0.01875 | 58.8 | 0.00712 | 61.3 | 0.00226 | 74.0 |
| 1 | 360 | 0.01563 | 65.6 | 0.00521 | 71.7 | 0.00208 | 76.0 |
| 3 | 120 | 0.01389 | 69.5 | 0.00469 | 74.5 | 0.00191 | 78.0 |
| 3 | 240 | 0.01042 | 77.1 | 0.00295 | 84.0 | 0.00122 | 85.9 |
| 3 | 360 | 0.00903 | 80.1 | 0.00243 | 86.8 | 0.00104 | 88.0 |

Other features, advantages and embodiments of the invention disclosed herein will be readily apparent to those exercising ordinary skill after reading the foregoing disclosures. In this regard, while specific embodiments of the invention have been described in considerable detail, variations and modifications of these embodiments can be effected without departing from the spirit and scope of the invention as described and claimed.

What is claimed is:

1. A method for purifying a used aqueous N-methylmorpholine N-oxide (NMMO) solution reclaimed from a spinning aqueous solution to remove coloring and metal ion impurities remaining in said solution from producing a cellulose dope from a cellulose solution, comprising:

(a) oxidizing a portion of said coloring impurities in the spinning aqueous solution with hydrogen peroxide;

(b) purifying any remaining coloring impurities with active carbon to provide an uncolored aqueous N-methylmorpholine N-oxide solution; and (c) removing metal ion impurities from the solution of step (b) using chitosan to provide a reclaimed, purified and uncolored N-methylmorpholine N-oxidesolution.

2. The method of claim 1, wherein the absorbance of said reclaimed, purified and uncolored N-methylmorpholine N-oxide solution is about 0 when measured at wavelengths of 400 nm and 450 nm.

3. The method of claim 1, wherein the reclaimed, purified and uncolored N-methylmorpholine N-oxide solution has less than 1 ppm iron or copper ions.

4. The method of claim 1, wherein said hydrogen peroxide is added in an amount of about 0.1 to about 10% by weight of hydrogen peroxide based on the total weight of the used aqueous solution.

5. The method of claim 1, wherein said oxidizing is carried out at temperatures of from about 20° C. to about 100° C.

6. The method of claim 1, wherein the added amount of chitosan and cation-exchange resin is from about 0.5 to about 5% by weight.

* * * * *